United States Patent
Chen

(10) Patent No.: US 7,969,523 B2
(45) Date of Patent: Jun. 28, 2011

(54) MULTI-DOMAIN VERTICAL ALIGNMENT LIQUID CRYSTAL DISPLAY

(75) Inventor: Hung-Yu Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 236 days.

(21) Appl. No.: 12/286,380

(22) Filed: Sep. 29, 2008

(65) Prior Publication Data

US 2009/0086117 A1  Apr. 2, 2009

(30) Foreign Application Priority Data

Sep. 28, 2007  (CN) .......................... 2007 1 0123709

(51) Int. Cl.
*G02F 1/1368* (2006.01)
(52) U.S. Cl. .............................. 349/48; 349/47; 349/144
(58) Field of Classification Search .................. None
See application file for complete search history.

(56) References Cited

U.S. PATENT DOCUMENTS

| | | | |
|---|---|---|---|
| 6,628,349 B1 * | 9/2003 | Takei et al. .................. 349/43 |
| 7,016,001 B2 | 3/2006 | Tanaka et al. | |
| 2005/0213015 A1 * | 9/2005 | Shimoshikiryo ............. 349/144 |
| 2006/0103800 A1 * | 5/2006 | Li et al. ......................... 349/129 |
| 2006/0109406 A1 * | 5/2006 | Sasabayashi et al. ......... 349/129 |
| 2007/0018927 A1 | 1/2007 | Kim | |
| 2009/0040413 A1 * | 2/2009 | Chen et al. ..................... 349/48 |
| 2009/0066619 A1 * | 3/2009 | Chen .............................. 345/87 |

FOREIGN PATENT DOCUMENTS

CN  1645197 A  7/2005
CN  1900799 A  1/2007

* cited by examiner

*Primary Examiner* — Mike Stahl
(74) *Attorney, Agent, or Firm* — Wei Te Chung

(57) ABSTRACT

A liquid crystal display includes an insulating substrate, a plurality of parallel gate lines disposed on the insulating substrate, and a plurality of data lines disposed on the insulating substrate. The data lines insulatingly intercross the gate lines. An intersection between two of the plurality of gate lines and a corresponding two of the plurality of data lines defines a pixel region. Each pixel region includes a first thin film transistor (TFT), a first pixel electrode, and a second pixel electrode. The first TFT includes a first gate electrode connected with the gate line, a first source electrode connected with the first pixel electrode, and a first drain electrode connected with the first pixel electrode. A voltage of the first pixel electrode is different from a voltage of the second pixel electrode.

20 Claims, 4 Drawing Sheets

MULTI-DOMAIN VERTICAL ALIGNMENT LIQUID CRYSTAL DISPLAY

CROSS-REFERENCE TO RELATED APPLICATION

This application is related to, and claims the benefit of, a foreign priority application filed in China as Serial No. 200710123709.0 on Sep. 28, 2007. The related application is incorporated herein by reference.

FIELD OF THE INVENTION

The present disclosure relates to liquid crystal displays, and more particularly to multi-domain vertical alignment (MVA) liquid crystal displays.

GENERAL BACKGROUND

LCDs have the advantages of portability, low power consumption, and low radiation, and have been widely used in various portable information products such as notebooks, personal digital assistants (PDAs), video cameras and the like. A conventional LCD such as a twisted nematic (TN) LCD provides a limited viewing angle of the LCD. Thus, MVA LCDs were developed to improve the viewing angle of the LCD.

Referring to FIG. 9, one such MVA liquid crystal display is shown. The liquid crystal display 1 includes a first substrate assembly (not shown), a second substrate assembly generally facing the first substrate assembly, and a liquid crystal layer (not labeled) sandwiched between the first substrate assembly and the second substrate assembly. The liquid crystal layer includes a plurality of liquid crystal molecules 131.

The first substrate assembly includes a color filter (not shown), a common electrode (not shown), and a plurality of first protrusions 119, arranged in that order. The color filter includes a plurality of red filter units (not shown), a plurality of green filter units (not shown), and a plurality of blue filter units (not shown). The first protrusions 119 each are triangular in cross-section, and are arranged along a plurality of V-shaped paths.

The second substrate assembly includes a plurality of parallel gate lines 121 that each extend parallel to a first axis, a plurality of first parallel data lines 122 that each extend parallel to a second axis orthogonal to the first axis, a plurality of parallel second data lines 124 each extending parallel to the second axis, a plurality of first thin film transistors (TFTs) 161, a plurality of second TFTs 162, a plurality of first pixel electrodes 171, a plurality of second pixel electrodes 172, and a plurality of second protrusions 129.

The first data lines 122 and the second data lines 124 are arranged alternately. Every two adjacent first data lines 122, together with every two adjacent gate lines 121, form a rectangular area, defined as a pixel region 150. Each pixel region 150 corresponds to a filter unit of the color filter. Each second data line 124 is disposed across the middle of a corresponding pixel region 150, and divides the pixel region 150 into a first sub-pixel region 151 and a second sub-pixel region 152.

In each pixel region 150, the first TFT 161 is located in the vicinity of an intersection of the first data line 122 and the gate line 121. The second TFT 162 is located in the vicinity of an intersection of the second data line 124 and the gate line 121. Gate electrodes (not labeled) of the first TFT 161 and the second TFT 162 are connected to the same gate line 121. A source electrode (not labeled) of the first TFT 161 is connected to the first data line 122. A source electrode (not labeled) of the second TFT 162 is connected to the second data line 124. The first pixel electrode 171 is located in the first sub-pixel region 151, connected with a drain electrode (not labeled) of the first TFT 161. The second pixel electrode 172 is located in the second sub-pixel region 152, connected with a drain electrode (not labeled) of the second TFT 162. The first data line 122 provides a plurality of first gray-scale voltages to the corresponding first pixel electrode 171 via the first TFT 161. The second data line 124 provides a plurality of second gray-scale voltages to the corresponding second pixel electrode 172 via the second TFT 162. The first gray-scale voltages and the second gray-scale voltages are applied thereto independently.

The second protrusions 129 each are triangular in cross-section, arranged along a plurality of V-shaped paths. The second protrusions 129 and the first protrusions 119 are arranged alternately.

Referring also to FIG. 10, a top-down view of orientations of four of the liquid crystal molecules 131, according to the first protrusions 119 and the second protrusions 129, is shown. In each frame, when a first gray-scale voltage is applied to the first pixel electrode 171, and a common voltage is applied to the common electrode, an electric field is generated therebetween. The liquid crystal molecules 131 in the first sub-pixel region 151 re-orient according to the electric field. The liquid crystal molecules 131 are guided by the protrusions 119, 129 and thereby become aligned along four different axes. Thus four domains are defined according to the protrusions 119, 129.

Similarly, in the same frame, when a second gray-scale voltage is applied to the second pixel electrode 172, and a common voltage is applied to the common electrode, an electric field is generated therebetween. The liquid crystal molecules 131 in the second sub-pixel region 152 re-orient according to the electric field. The liquid crystal molecules 131 are guided by the protrusions 119, 129 and thereby align along four different axes. Thus four domains are defined according to the protrusions 119, 129. Referring also to FIG. 11, because the voltages of the first pixel electrode 171 differ from the voltage of the second pixel electrode 172 in each frame, a tilt angle $\theta_1$ of the liquid crystal molecules 131 in the first sub-pixel region 151 differs from a tilt angle $\theta_2$ of the liquid crystal molecules 131 in the second sub-pixel region 152. Thus, a total of eight domains are defined in each pixel region 150. The liquid crystal display 1 achieves 8-domain vertical alignment.

However, each pixel region 150 requires a first data line 122 and a second data line 124 for the liquid crystal display 1 to perform the 8-domain vertical alignment. The layout of the first data line 122 and the second data line 124 is complicated, resulting in an increase of cost thereof.

It is desired to provide an improved liquid crystal display which can overcome the limitations described.

SUMMARY

In one embodiment, a liquid crystal display includes an insulating substrate, a plurality of parallel gate lines on the insulating substrate, and a plurality of data lines on the insulating substrate. The data lines insulatingly intercross the gate lines. An intersection between two of the plurality of gate lines and a corresponding two of the plurality of data lines defines a pixel region. Each pixel region includes a first thin film transistor (TFT), a first pixel electrode, and a second pixel electrode. The first TFT includes a first gate electrode connected with the gate line, a first source electrode connected with the first pixel electrode, and a first drain electrode connected with the first pixel electrode. A voltage of the first pixel electrode is different from a voltage of the second pixel electrode.

Other novel features and advantages will become more apparent from the following detailed description when taken in conjunction with the accompanying drawings. In the drawings, all the views are schematic.

DETAILED DESCRIPTION

Reference will now be made to the drawings to describe certain inventive embodiments of the present disclosure in detail.

Figure 1:
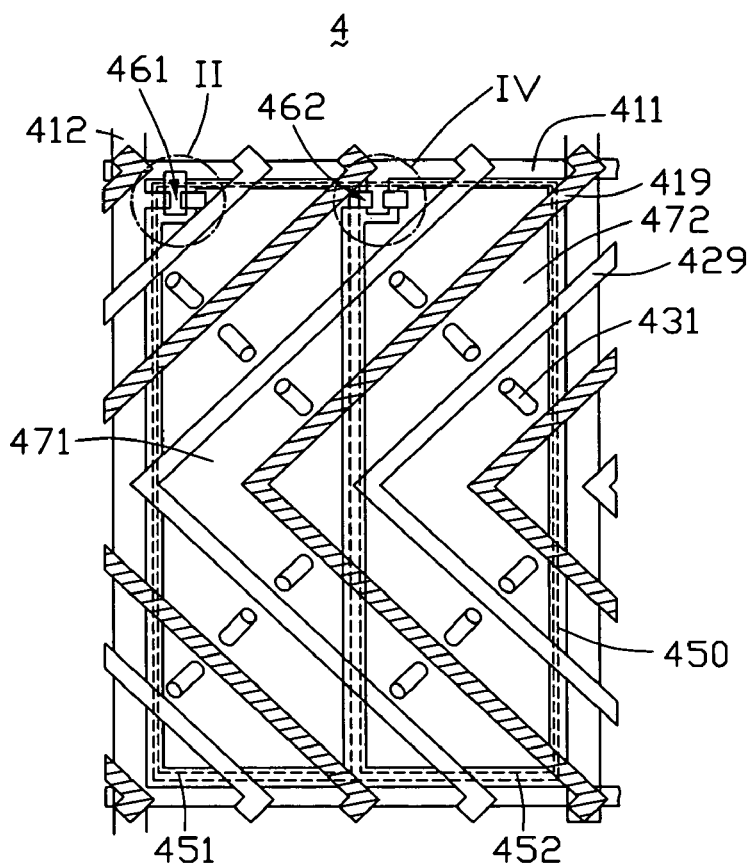
FIG. 1 is a top plan view of part of a liquid crystal display according to a first embodiment of the present disclosure, the liquid crystal display including a plurality of first TFTs, a plurality of second TFTs, and a plurality of molecules.

Referring to FIG. 1, a liquid crystal display 4 according to a first embodiment of the present disclosure includes a first substrate assembly (not labeled), a second substrate assembly (not labeled) parallel to the first substrate assembly, and a liquid crystal layer (not labeled) sandwiched between the two substrate assemblies. The liquid crystal layer includes a plurality of liquid crystal molecules 431.

The first substrate assembly includes a color filter (not shown), a common electrode (not shown), and a plurality of first protrusions 419, arranged in that order from top to bottom. The color filter includes a plurality of red filter units (not shown), a plurality of green filter units (not shown), and a plurality of blue filter units (not shown). The first protrusions 419 are parallel, each having a triangular cross-section and arranged along a plurality of V-shaped paths.

The second substrate assembly includes a plurality of parallel gate lines 411, each extending along a first axis, a plurality of parallel data lines 412, each extending along a second axis orthogonal to the first axis, a plurality of first TFTs 461, a plurality of second TFTs 462, a plurality of first pixel electrodes 471, a plurality of second pixel electrodes 472, and a plurality of second protrusions 429.

Every two adjacent gate lines 411 and every two adjacent data lines 412 cooperatively form a rectangular area defined as a pixel region 450. Each pixel region 450 corresponds to a filter unit of the color filter. Each pixel region 450 includes a first sub-pixel region 451 and a second sub-pixel region 452. Each first sub-pixel region 451 includes one of the first TFTs 461 and one of the first pixel electrodes 462. The first TFT 461 is disposed in the vicinity of an intersection of the gate line 411 and the data line 412. Each second sub-pixel region 452 includes one second TFT 462, one second pixel electrode 472.

Figure 2:
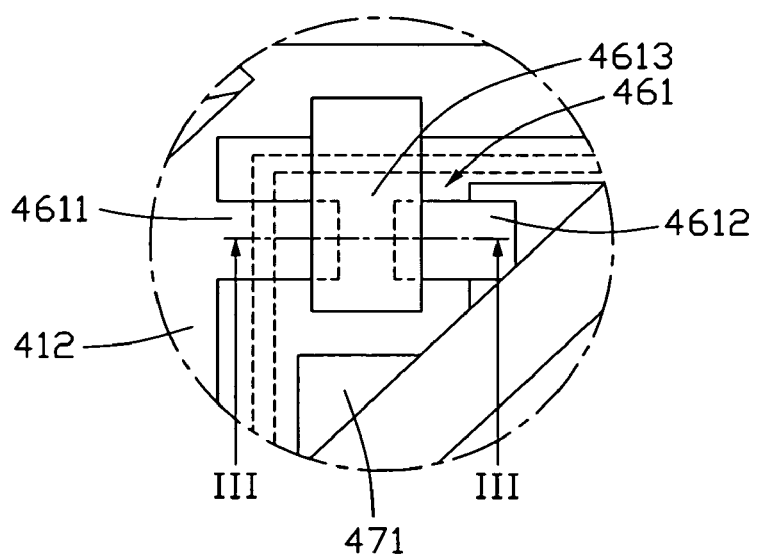
FIG. 2 is an enlarged schematic view of a circled portion II of FIG. 1.
Figure 3:
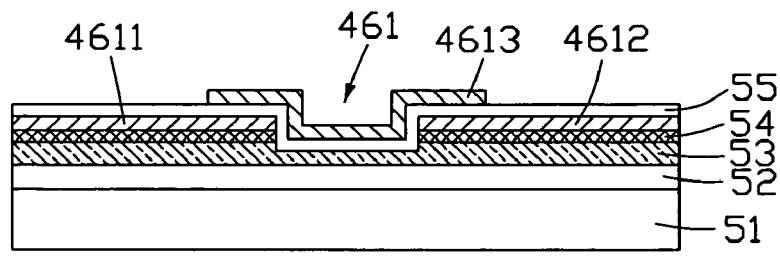
FIG. 3 is a schematic side view of one of the first TFTs taken along line III-III of FIG. 2.

Referring also to FIG. 2 and FIG. 3, the first TFT 461 includes a gate insulating layer 52, an amorphous silicon (a-Si) layer 53, a heavily doped a-Si layer 54, a first source electrode 4611, a first drain electrode 4612, a passivation layer 55, and a first gate electrode 4613. The gate insulating layer 52 covers an insulating substrate 51. The amorphous silicon (a-Si) layer 53 covers the gate insulating layer 52. The heavily doped a-Si layer 54 covers the a-Si layer 53. The a-Si layer 53 and the heavily doped a-Si layer 54 cooperatively define a concave (not labeled). The first source electrode 4611 and the first drain electrode 4612 are disposed on the heavily doped a-Si layer 54 and adjacent the concave. The passivation layer 55 covers the first source electrode 4611, the first drain electrode 4612, and a part of the a-Si layer 53 exposed by the concave. The first gate electrode 4613 covers the passivation layer 55 corresponding to the concave. Thus, the first TFT 461 is a top-gate TFT.

The first gate electrode 4613 is connected to a corresponding one of the gate lines 411. The first source electrode 4611 is connected to a corresponding one of the data lines 412. The first drain electrode 4612 is connected to a corresponding one of the pixel electrodes 471. The first gate electrode 4613, the first pixel electrode 471, and the second pixel electrode 472 can be made by a same photo-mask process, and can be made from a same material such as indium-zinc oxide (IZO) or indium tin oxide (ITO), for example. A thickness of the passivation layer 55 is less than a thickness of the gate insulating layer 52.

Figure 4:
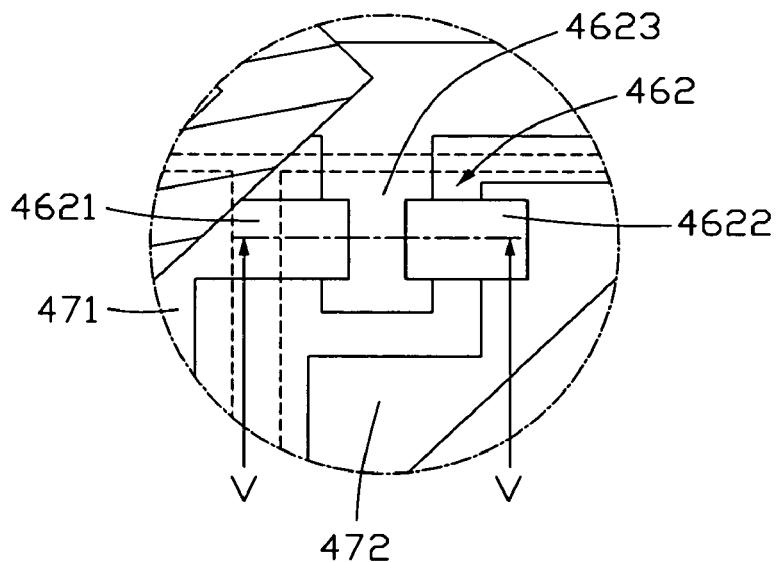
FIG. 4 is an enlarged schematic view of a circled portion IV of FIG. 1.
Figure 5:
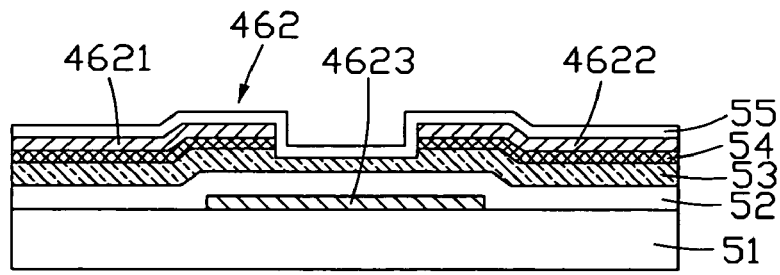
FIG. 5 is a schematic side view of one of the second TFTs taken along line V-V of FIG. 2.

Referring to FIG. 4 and FIG. 5, the second TFT 462 includes a second gate electrode 4623, the gate insulating layer 52, the amorphous silicon (a-Si) layer 53, the heavily doped a-Si layer 54, a second source electrode 4621, a second drain electrode 4622, and the passivation layer 55. The second gate electrode 4623 is disposed on an inner surface of the insulating substrate 51. The gate insulating layer 52 covers the insulating substrate 51 and the second gate electrode 4623. The a-Si layer 53 covers the gate insulating layer 52. The heavily doped a-Si layer 54 covers the a-Si layer 53. The a-Si layer 53 and the heavily doped a-Si layer 54 cooperatively define a concave (not labeled). The second source electrode 4621 and the second drain electrode 4622 are disposed on the heavily doped a-Si layer 54 adjacent the concave, respectively. The passivation layer 55 covers the second source electrode 4621, the second drain electrode 4622, and a part of the a-Si layer 53 exposed by the concave. Thus the second TFT 462 is a bottom-gate TFT.

The second gate electrode 4623 is connected to a corresponding gate line 411. The second source electrode 4621 is connected to the first pixel electrode 471. The second drain electrode 4622 is connected to the second pixel electrode 472.

Because the first TFT 461 is a top-gate TFT and the second TFT is a bottom-gate TFT and the thickness of the passsivation layer 55 is less than the thickness of the gate insulating layer 52, a switch-on voltage of the first TFT 461 is less than a switch-on voltage of the second TFT 462.

Scanning voltages of the gate lines 411 are substantially equal to the switch-on voltage of the first TFT 461. When the scanning voltage is applied to the first sub-pixel region 451, the first TFT 471 is completely switched on. Thus, a voltage of the first pixel electrode 471 is substantially equal to a voltage of the corresponding data line 412. The second TFT 472 is partly switched on. Thus, a voltage of the second pixel electrode 472 is lower than a voltage of the corresponding first pixel electrode 471.

Figure 6:
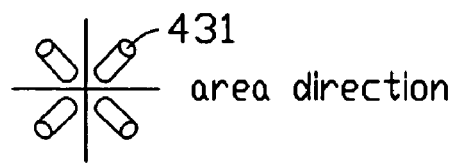
FIG. 6 is a top-down view of orientations of four of the liquid crystal molecules in the first sub-pixel region of FIG. 1.

When the corresponding voltages are applied to the first pixel electrode 471 and the common electrode, electric fields are generated. Referring to FIG. 6, the liquid crystal molecules 431 re-orient according to the electric fields. The liquid crystal molecules 431 are guided by the first protrusions 419 and the second protrusions 429, thereby aligning along four different axes. Thus, four domains are defined accordingly.

Figure 7:
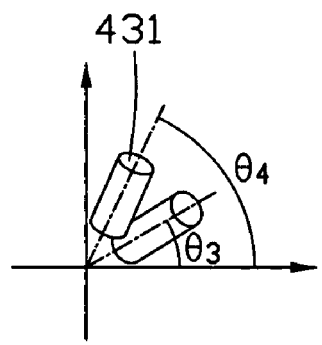
FIG. 7 is a schematic side view of one of the liquid crystal molecules in the first sub-pixel region and one of the liquid crystal molecules in the second sub-pixel region of FIG. 1, the liquid crystal molecules having different tilt angles.

Similarly, the liquid crystal molecules 431 in the second sub-pixel region 452 are guided by the first protrusions 419 and the second protrusions 429, thereby aligning along four different axes. Referring also to FIG. 7, because the voltage of the first pixel electrode 471 is higher than that of the second pixel electrode 472, tilt angles $\theta_3$ of the liquid crystal molecules 431 corresponding to the first pixel electrode 471 differ from tilt angles $\theta_4$ of the liquid crystal molecules 431 corresponding to the second pixel electrode 472. Thus, a total of eight domains are defined in the pixel region 450. The liquid crystal display 4 achieves 8-domain vertical alignment.

Each pixel region 450 of the liquid crystal display 4 includes the top-gate first TFT 461 and the bottom-gate second TFT 462. The second TFT 462 is partly switched on when applied with a scanning voltage by the gate line 411. That is, a voltage difference generates between the first pixel electrode 471 and the second pixel electrode 472 to make the liquid crystal display 4 achieve 8-domain vertical alignment. No auxiliary data line is needed to apply a different voltage to the second pixel electrode 472. That is, each pixel region 450 of the liquid crystal display 4 needs only one data line 412 to achieve 8-domain vertical alignment. Layout of the data lines 412 is simplified, and the cost of the liquid crystal display 4 is reduced correspondingly.

Figure 8:
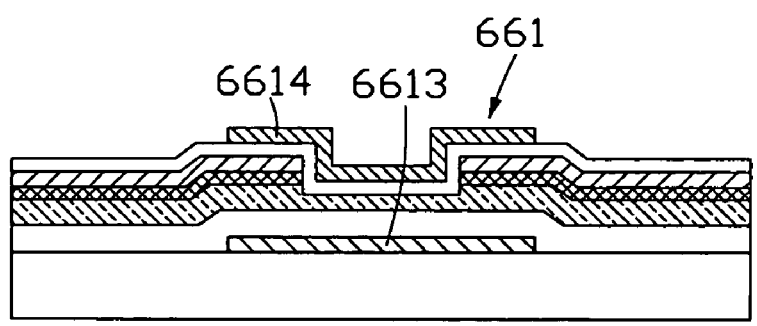
FIG. 8 is similar to FIG. 3, but shows a corresponding view of a resistor of a first TFT according to a second embodiment of the present disclosure.
Figure 9:
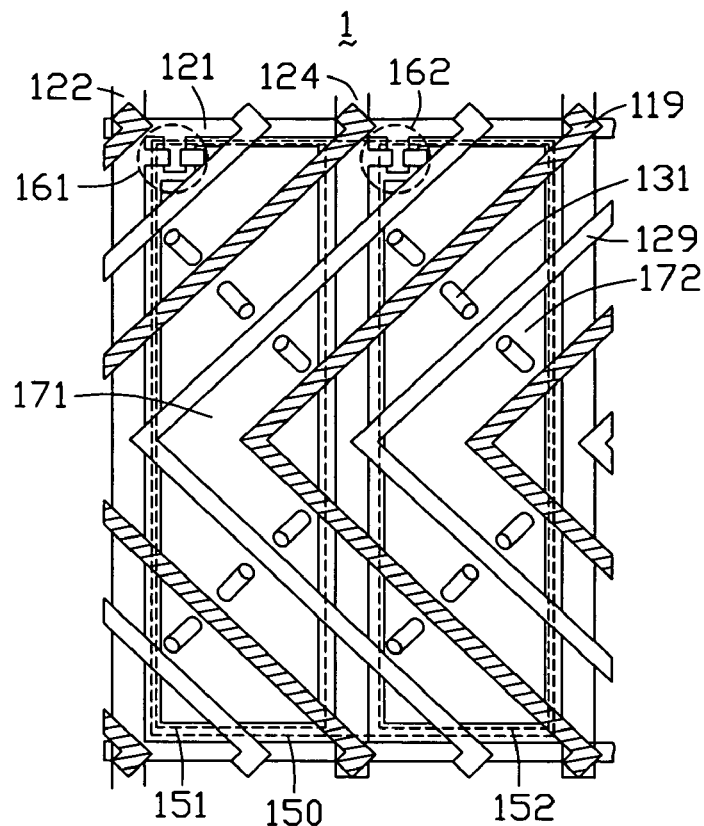
FIG. 9 is a top plan view of a conventional liquid crystal display, defining a plurality of first sub-pixel regions and a plurality of second sub-pixel regions, and including a plurality of liquid crystal molecules.
Figure 10:
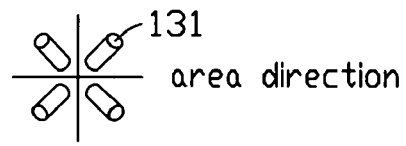
FIG. 10 is a top-down view of orientations of four of the liquid crystal molecules in the pixel region of FIG. 9.
Figure 11:
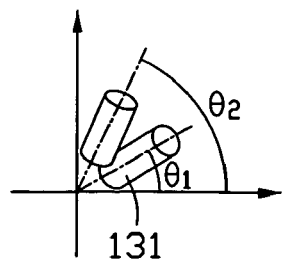
FIG. 11 is a schematic, side view of one of the liquid crystal molecules in the first sub-pixel region and one of the liquid crystal molecules in the second sub-pixel region of FIG. 9, the liquid crystal molecules having different tilt angles.

Referring to FIG. 8, a side view of a part of a first TFT 661 according to a second embodiment of the present disclosure is shown. The first TFT 661 of the second embodiment is similar to the first TFT 461 of the first embodiment. However, the first TFT 661 is a double-gate TFT including a first gate electrode 6613 and a second gate electrode 6614. A switch-on voltage of the double-gate first TFT 661 is less than the switch-on voltage of the top-gate first TFT 461 of the first embodiment.

Because the switch-on voltage of the first TFT 661 is reduced, the liquid crystal display thereof has less power consuming and also achieves 8-domain vertical alignment.

Further or alternative embodiments may include, in a first example, the second source electrodes of the second TFTs 462 may be connected with the same data lines as the first source electrodes of the first TFTs 461. In a second example, the second source electrodes of the second TFTs 462 may be connected with the corresponding first drain electrodes of the first TFTs 461. In a third example, a capacitor may be placed to connect the first pixel electrodes and the second pixel electrodes to generate a voltage difference therebetween.

It is believed that the present embodiments and their advantages will be understood from the foregoing description, and it will be apparent that various changes may be made thereto without departing from the spirit or scope of the disclosure or sacrificing all of its material advantages, the examples hereinbefore described merely being preferred or exemplary embodiments of the disclosure.

What is claimed is:

1. A liquid crystal display comprising:
an insulating substrate;
a plurality of parallel gate lines disposed on the insulating substrate; and
a plurality of data lines disposed on the insulating substrate and insulatingly intercrossing the gate lines, thereby defining a plurality of pixel regions each between an intersection between two of the plurality of gate lines and a corresponding two of the plurality of data lines;
wherein each pixel region comprises a first thin film transistor (TFT), a first pixel electrode, and a second pixel electrode, the first TFT comprises a gate insulating layer, a first gate electrode connected with the gate line, a first source electrode connected with the data line, a first drain electrode connected with the first pixel electrode, and a passivation layer, the gate insulating layer covers the insulating substrate, the first source electrode and the first drain electrode cover the gate insulating layer, the passivation layer covers the first source electrode and the first drain electrode, and the first gate electrode covers the passivation layer; and
each pixel region further comprises a second gate electrode, a second source electrode, and a second drain electrode, the second gate electrode is disposed between the gate insulating layer and the insulating substrate, the second source electrode and the second drain electrode are disposed between the gate insulating layer and the passivation layer, and the second gate electrode, the gate insulating layer, the second source electrode, the second drain electrode and the passivation layer cooperate to define a second TFT, the second gate electrode connected with the gate line, the second source electrode connected with the first pixel electrode, the second drain electrode connected with the second pixel electrode, and a voltage of the first pixel electrode being different from a voltage of the second pixel electrode.

2. The liquid crystal display of claim 1, wherein the first TFT further comprises an amorphous silicon layer and a heavily doped a-Si layer disposed on the insulating substrate in that order, the amorphous silicon layer and the heavily doped a-Si layer cooperatively defining a concave, the first source electrode and the first drain electrode being disposed adjacent the concave.

3. The liquid crystal display of claim 2, wherein the passivation layer substantially covers the amorphous silicon layer, the first source electrode, and the first drain electrode.

4. The liquid crystal display of claim 3, wherein the first gate electrode and the first pixel electrode are made from a same material.

5. The liquid crystal display of claim 1, wherein the second gate electrode is disposed on an inner surface of the insulating substrate.

6. The liquid crystal display of claim 5, wherein the second TFT further comprises an amorphous silicon layer and a heavily doped a-Si layer disposed on the gate insulating layer in that order, the amorphous silicon layer and the heavily doped a-Si layer cooperatively defining a concave, the second source electrode and the second drain electrode being disposed adjacent the concave.

7. The liquid crystal display of claim 6, wherein the passivation layer substantially covers the amorphous silicon layer, the second source electrode, and the second drain electrode.

8. The liquid crystal display of claim 3, wherein the first TFT further comprises a third gate electrode on an inner surface of the insulating substrate corresponding to the first gate electrode.

9. The liquid crystal display of claim 1, wherein the first TFT is a top-gate TFT, and the second TFT is a bottom-gate TFT.

10. The liquid crystal display of claim 8, wherein the first TFT is a double-gate TFT, and the second TFT is a bottom-gate TFT.

11. A liquid crystal display comprising:
an insulating substrate; and
a plurality of pixel regions,
each pixel region comprising:
a gate line;
a data line;
a first pixel electrode;
a second pixel electrode; and
a first thin film transistor (TFT);
wherein the first TFT comprises a gate insulating layer, a first gate electrode connected with the gate line, a first source electrode connected with the data line, a first drain electrode connected with the first pixel electrode, and a passivation layer, the gate insulating layer covers the insulating substrate, the first source electrode and the first drain electrode cover the gate insulating layer, the passivation layer covers the first source electrode and the first drain electrode, and the first gate electrode covers the passivation layer; and
each pixel region further comprising:
a second gate electrode;
a second source electrode; and
a second drain electrode;
wherein the second gate electrode is disposed between the gate insulating layer and the insulating substrate, the second source electrode and the second drain electrode are disposed between the gate insulating layer and the passivation layer, and the second gate electrode, the gate insulating layer, the second source electrode, the second drain electrode and the passivation layer cooperate to define a second TFT, the second gate electrode connected with the gate line, the second source electrode connected with the first pixel electrode, the second drain electrode connected with the second pixel electrode, and a voltage of the first pixel electrode being different from a voltage of the second pixel electrode.

12. The liquid crystal display of claim 11, wherein the first TFT is a top-gate TFT, and the second TFT is a bottom-gate TFT.

13. The liquid crystal display of claim 11, wherein the first TFT further comprises a third gate electrode on an inner surface of the insulating substrate corresponding to the first gate electrode, the first TFT is a double-gate TFT, and the second TFT is a bottom-gate TFT.

14. The liquid crystal display of claim 1, wherein a thickness of the passivation layer is less than a thickness of the gate insulating layer.

15. The liquid crystal display of claim 11, wherein a thickness of the passivation layer is less than a thickness of the gate insulating layer.

16. The liquid crystal display of claim 11, wherein the first TFT further comprises an amorphous silicon layer and a heavily doped a-Si layer disposed on the insulating substrate in that order, the amorphous silicon layer and the heavily doped a-Si layer cooperatively defining a concave, the first source electrode and the first drain electrode being disposed adjacent the concave, the passivation layer substantially covering the amorphous silicon layer, the first source electrode, and the first drain electrode, and the first gate electrode substantially covering the passivation layer.

17. The liquid crystal display of claim 11, wherein the second gate electrode is disposed on an inner surface of the insulating substrate.

18. The liquid crystal display of claim 17, wherein the second TFT further comprises an amorphous silicon layer and a heavily doped a-Si layer disposed on the gate insulating layer in that order, the amorphous silicon layer and the heavily doped a-Si layer cooperatively defining a concave, the second source electrode and the second drain electrode being disposed adjacent the concave, and the passivation layer substantially covering the amorphous silicon layer, the second source electrode, and the second drain electrode.

19. A liquid crystal display comprising:
an insulating substrate;
a plurality of parallel gate lines disposed on the insulating substrate; and
a plurality of data lines disposed on the insulating substrate and insulatingly intercrossing the gate lines, thereby defining a plurality of pixel regions each between an intersection between two of the plurality of gate lines and a corresponding two of the plurality of data lines;
wherein each pixel region comprises two thin film transistors (TFTs), a first pixel electrode, and a second pixel electrode, a gate electrode of each TFT is connected with the gate line, a source electrode and a drain electrode of one of the TFTs are connected with the data line and the first pixel electrode, respectively, a source electrode and a drain electrode of the other TFT are connected with the first pixel electrode and the second pixel electrode, respectively, the first TFT and the second TFT share a same gate insulating layer and a passivation layer covering the gate insulating layer, the gate electrode of either one of the TFTs is disposed below the gate insulating layer, and the gate electrode of the other TFT covers the passivation layer.

20. The liquid crystal display of claim 19, wherein a thickness of the passivation layer is less than a thickness of the gate insulating layer, the two TFTs are a first TFT and a second TFT, the first TFT is a top-gate TFT, the second TFT is a bottom-gate TFT, the source electrode of the first TFT is connected with the data line, the drain electrode of the first TFT is connected with the first pixel electrode, and the source electrode and the drain electrode of the second TFT are connected with the first pixel electrode and the second pixel electrode, respectively.

* * * * *